(12) United States Patent
Orlik et al.

(10) Patent No.: US 8,238,277 B2
(45) Date of Patent: Aug. 7, 2012

(54) PARAMETRIC COMPRESSION OF RANK-1 ANALOG FEEDBACK

(75) Inventors: Philip V. Orlik, Cambridge, MA (US); Ron Porat, San Diego, CA (US); Ramesh Annavajjala, Quincy, MA (US); Man-On Pun, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 370 days.

(21) Appl. No.: 12/732,275

(22) Filed: Mar. 26, 2010

(65) Prior Publication Data

US 2010/0272014 A1    Oct. 28, 2010

Related U.S. Application Data

(60) Provisional application No. 61/173,126, filed on Apr. 27, 2009.

(51) Int. Cl.
*H04B 7/00*     (2006.01)
*H04W 4/00*    (2009.01)

(52) U.S. Cl. .................................. 370/310; 370/328
(58) Field of Classification Search .................. None
See application file for complete search history.

(56) References Cited

U.S. PATENT DOCUMENTS

2010/0158151 A1*  6/2010  Krauss et al. ................. 375/267
\* cited by examiner

*Primary Examiner* — John Blanton
(74) *Attorney, Agent, or Firm* — Dirk Brinkman; Gene Vinokur

(57) ABSTRACT

Channel state information in a closed-loop, multiple-input, multiple-output wireless networks is fed back from each mobile station to a base station by first determining a transmit covariance matrix R, and applying a singular value decomposition (SVD) $R = U\Sigma V^H$, where U, V are left and right singular vector matrices, $\Sigma$ is a diagonal matrix with singular values. The matrix V includes column vectors V. A beamforming vector $v_{max} = [1 \; \exp(j\Phi) \exp(j2\Phi) \ldots \exp(j\Phi)]/\sqrt{N}$ is approximated by the column vector V having a maximum magnitude, where $\Phi$ is a real number. Then, only the angle $\Phi$ is fed back using a phase modulation mapping of the components $\exp(j\Phi)$ onto the associated subcarrier.

16 Claims, 5 Drawing Sheets

US 8,238,277 B2

PARAMETRIC COMPRESSION OF RANK-1 ANALOG FEEDBACK

RELATED APPLICATION

This Non-Provisional U.S. application claims priority to U.S. Provisional Application 61/173,126, entitled "Parametric Compression of Rank-1 Analog Feedback," filed Apr. 27, 2009, incorporated herein by reference.

FIELD OF THE INVENTION

This invention relates generally to feeding back channel state information (CSI), and more particularly to feeding back CSI in closed-loop (CL) multiple-input, multiple-output (MIMO) wireless networks.

BACKGROUND OF THE INVENTION

Feedback of channel stat information (CSI) can increase the performance of closed-loop (CL) multiple-input, multiple-output (MIMO) wireless networks. In MIMO networks, each cell includes a base station (BS) and a set of mobile stations (MS), where each MS estimates and feeds back the CSI of a downlink (DL) from the BS to the MS on an uplink (UL). The feedback can either be codebook based, or in analog form. The CSI feedback is particularly important for the MS at edges of adjacent cells where inter-cell interference (ICI) can occur. As defined herein, feeding back means transmitting from the MS to the BS.

Feeding back rank adapted channel singular vectors, in a similar fashion to codebook based feedback, is superior to all other analog feedback forms known for single-user (SU) MIMO networks.

Feedback in analog form mitigates colored interference regardless of channel conditions, signal-to-noise ratios (SNR) and interference color, when compared to codebook based feedback when both use the UL channel resources.

In addition to pure analog feedback options, one can also use analog feedback for a differential mode. The difference is between the optimal singular vector and the best codeword that is fed back unquantized.

The main appeal of analog feedback is for multi user MIMO (MU-MIMO) applications, or multi-BS MIMO applications, including femto and relay networks, where joint processing of multiple BS is performed to achieve coherent combining and interference nulling for MS at the edges of the adjacent cells.

This is mainly due to the fact that the channel feedback accuracy must increase linearly in dB with an increase in the SNR to remain within fixed amount of dB from the MU-MIMO channel capacity.

Analog feedback is best suited for this task. The accuracy naturally increases with the SNR, and can provide simple and unified feedback for a typical macro-cell, as well as femto and pico cells, and relay station to base station links, where the typical SNR is expected to be much higher.

On the other hand, codebook feedback in networks designed according to the IEEE 802.16m standard limits the performance, due to channel feedback quantization errors at the MS.

The current IEEE 802.16m "System Description Document" (SDD) assumes rank-1 feedback for MU-MIMO. Therefore, it is desired to optimize analog feedback by informing the transmitter with a largest singular vector. As defined herein, the largest singular vector is the vector associated with the singular value with maximum magnitude.

General Analog Rank-1 Feedback

As shown in FIG. 1, for a conventional BS with N antennas, N complex valued numbers are needed to represent the largest singular vector of the transmit covariance matrix. Therefore, at least N subcarriers are needed to feedback a singular vector. That is, the transmit covariance matrix, which is represented by a matrix R 120, can be decomposed using a singular value decomposition (SVD) as $$R = U\Sigma V^H,$$

where U, V are the left and right singular vector matrices with N×N entries, and $\Sigma$ is an N×N diagonal matrix whose entries are the singular values.

A largest singular vector 110, i.e., the column of the matrix V with a maximum magnitude, is feedback to the BS. The components of the largest singular vector $\{V_1, V_2, \ldots, V_N\}$ are assigned to N subcarriers associated with N antennas. The complex numbers in the vector can be mapped to N subcarriers using, for example, amplitude modulation (AM).

Repetition 130 can be used to improve reliability in a low SNR range. Increasing the number of BS antennas improves performance on the UL. In a BS with 4 or 8 antennas, no repetition is required for most SNR ranges. Throughout this description, we use the notation $V_{max}$ to denote the largest (maximum magnitude) singular vector.

It is possible to feedback only N−1 complex numbers by rotating all elements by a negative of an angle of the first element. This makes the first element real, so that the first element does not need to be transmitted.

If the angle of the vector $V_1$ is $\phi$, then the feedback is $$\{\exp(-j\phi)^*v_2, \ldots, \exp(-j\phi)^*v_N\}, \text{ for } j=1 \text{ to } N.$$

At the BS, the first element can be determined because the sum power of all elements is 1. However, this makes the feedback more sensitive to power normalizations.

Because feedback in cellular networks, and in particular networks according to the IEEE 802.16m standard, is done per band (that is over 1 to 4 Physical Resource Blocks (PRB)). Two possibilities provide good results. Determine the largest singular vector of the average transmit covariance matrix in that band. Computation of the transmit covariance matrix is simple and needed for the adaptive mode.

General computation of the largest singular vector can be facilitated in most cases using a power method, or via the general SVD.

In most cases, the mobile stations have two receive antennas. Therefore, a simple closed form formula for the SVD of each subcarrier channel, for any number N of BS antennas, can be determined. It is also possible to average the singular vectors in a given band.

In particular for rank-1 feedback, the largest singular vector is simply a linear combination of the two channel rows, and the singular vectors are phase aligned before being averaged across the band of interest. A second averaging iteration can improve performance.

For MS with four antennas, a maximum likelihood (ML) receiver can be used for spatial multiplexing. An implementation can use a sphere decoder. The sphere decoders performs a QR decomposition to construct a search tree. After the QR decomposition is performed, obtaining the SVD is just another stage of the same procedure.

SUMMARY OF THE INVENTION

Channel state information in a closed-loop, multiple-input, multiple-output wireless networks is fed back from each mobile station in a cell to a base station by first determining a transmit covariance matrix R, and applying a singular value decomposition (SVD) $R = U\Sigma V^H$, where U, V are left and right singular vector matrices, E is a diagonal matrix with singular values. The matrix V includes column vectors V. A beamforming vector $v_{max} = [1 \exp(j\Phi)\exp(j2\Phi) \ldots \exp(j\Phi)]/\sqrt{N}]$ is approximated by the column vector V having a maximum magnitude, where an angle $\Phi$ is a real number. Then, only the angle $\Phi$ is fed back using a phase modulation mapping of the components $\exp(j\Phi)$ onto the associated subcarrier.

DETAILED DESCRIPTION OF THE PREFERRED EMBODIMENTS

Figure 1:
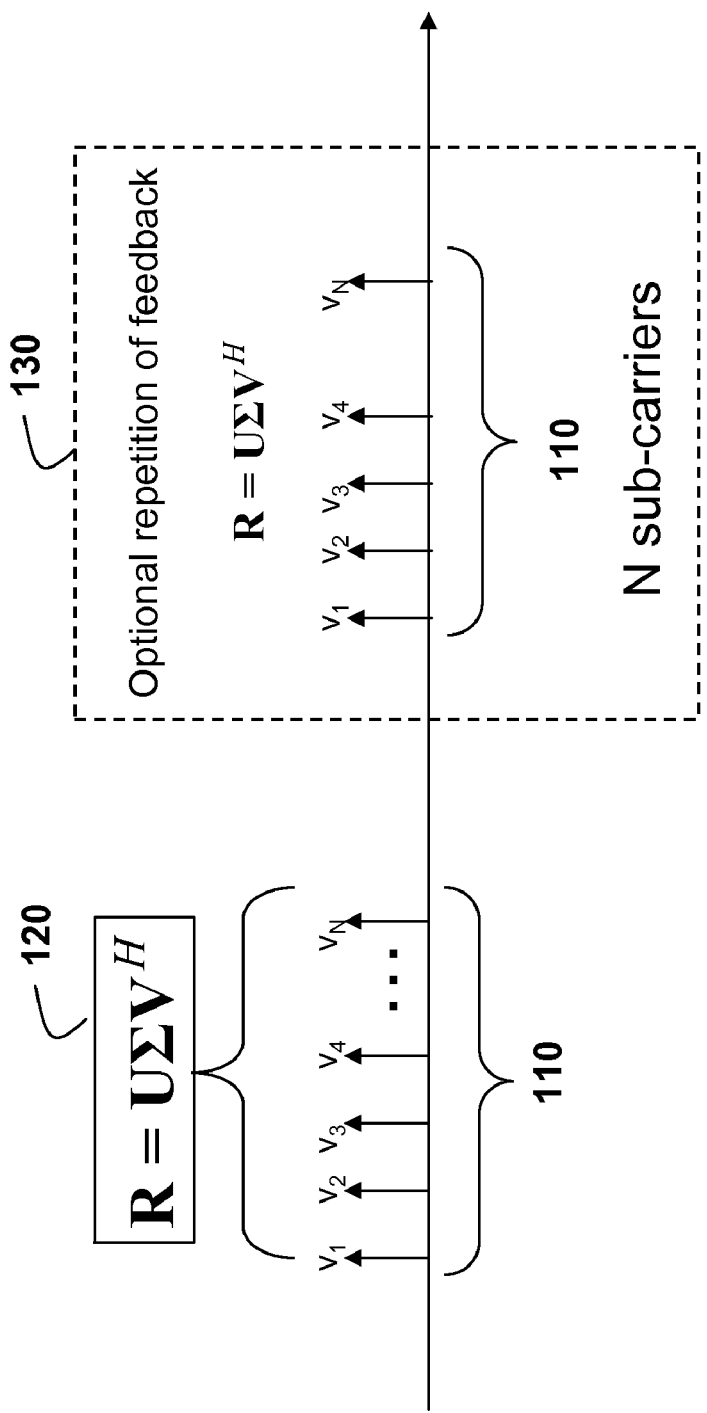
FIG. 1 is a schematic of general prior art analog rank-1 feedback.
Figure 2A:
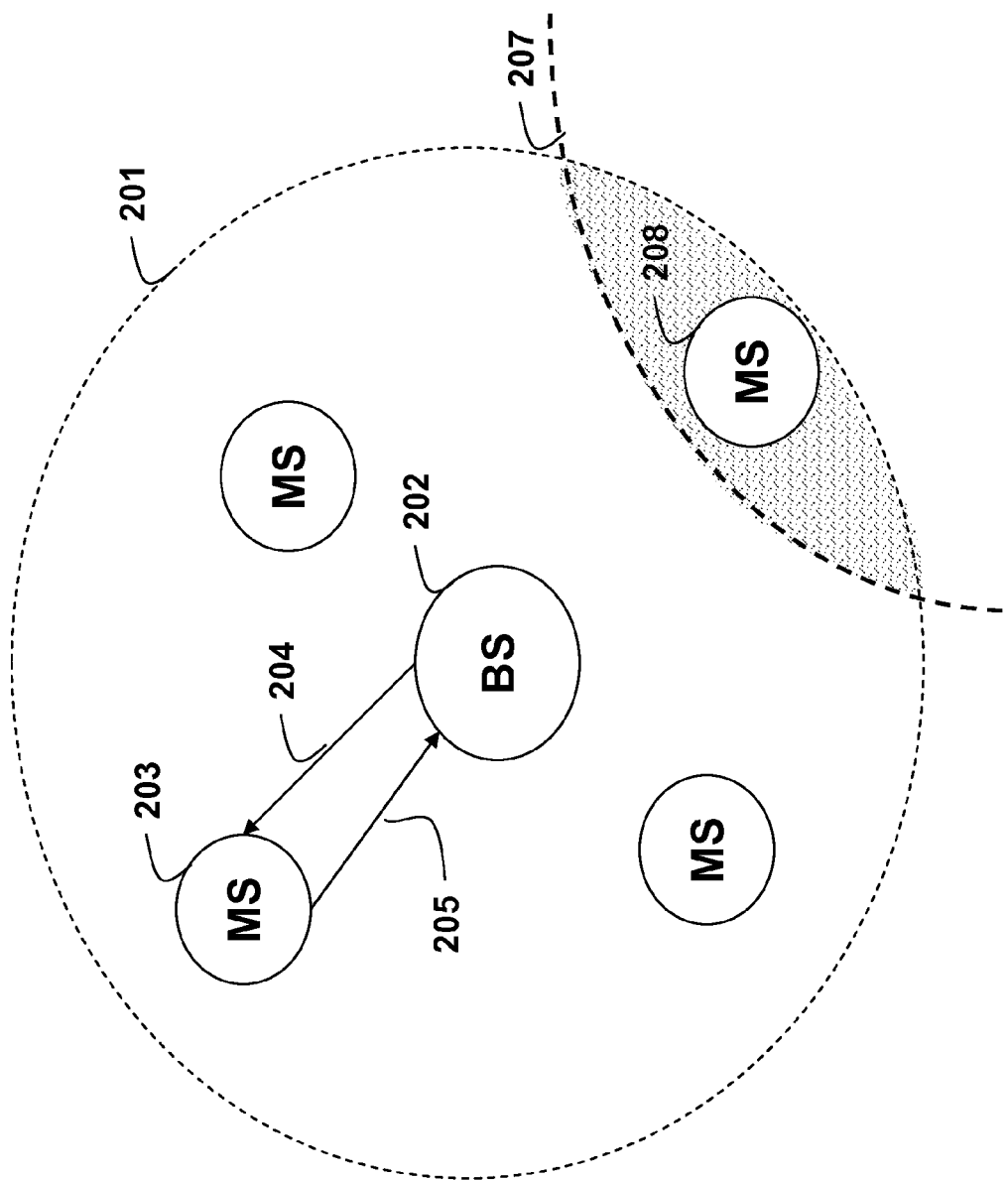
FIG. 2A is a schematic of a multi-input, multi-output network according to embodiments of the invention.

FIG. 2A shows a network according to embodiments of our invention. A cell 201 includes a base station (BS) 202, and a set of mobile stations (MS) 103. The BS communicates with each MS 203 via a downlink channel (DL) 204 using N antennas and N associated subcarriers, and the MS use an uplink channel (UL) 205 to communicate with the BS.

FIG. 2A also shows a portion of a potentially adjacent cell 207, which can cause inter-cell interfere (ICI) with the stations in the cell 101, particularly when a mobile station 108 is located near an edge of the cell.

Parametric Compression of Analog Rank-1 Feedback

In practical networks, closely spaced antennas are likely to be used to reduce costs of the BS. The antennas can be placed in a radar dome (radome). Neighborhood restrictions and zoning laws can also require small antenna footprints.

Other advantages of closely spaced calibrated arrays stem from an increased antenna correlation, which reduces a variability, across frequency and time, of the spatial signature of the MS, and enables improved multi-user (MU) MIMO, and multi-BS MIMO performance with a smaller channel feedback overhead.

In general, we are concerned with feedback in analog form to support rank-1 transmission. That is, the BS transmits a single data stream to each MS using the N antennas available at the BS. The goal of the analog feedback is to allow the BS to precode the data so that the MS receives a signal with larger signal to interference and noise ratio (SINR) than if the transmitter had no channel knowledge.

A transmit covariance matrix R is decomposed using a singular value decomposition (SVD) as $$R = U\Sigma V^H,$$

where U, V are the left and right singular vector matrices with N×N entries, the matrix V includes columns V, and H is a Hermitian operator and $\Sigma$ is an N×N diagonal matrix whose entries are the singular values.

In this section, we describe how knowledge of the geometry of the transmit antenna array can be utilized to further reduce the amount of feedback that is necessary to give the transmitter an approximation of the largest singular vector. Because we are considering only rank-1 transmission, the BS can beamform or "steer" transmission in the direction of intended MS. Also, because particular array configurations and geometries are assumed, we can make use of parametric expressions for the beamforming vectors as described below.

The following antenna configurations and feedback structures are described and are applicable for the serving cell, as well as adjacent potentially interfering cells (for multi-BS MIMO), i.e., $\lambda/2$ spaced 2, 4 or 8 vertically polarized antenna arrays (|| or |||| or ||||||||), with the N antennas arranged in a uniform linear array (ULA), and wherein a spacing between each antenna is at least half the carrier wavelength $\lambda$.

In this case, the largest singular vector V, which is the vector with a maximum magnitude in the matrix V is approximated as a beamforming vector $$v_{max} = \exp(j(0:N-1)*\Phi)/\sqrt{N},$$

and only one real number $\Phi$, which represents the angle of the beamforming vector is fed back by using a phase modulation mapping of $\exp(j\Phi)$ onto the associated subcarrier. In conventional mathematical notation, $\exp(\bullet) = e^{(j\Phi)}$. and colon, ':', in general, (i: j is used two represent a sequence of integers [i, i+1, i+2, ..., j], thus the equation uses a shorthand notation for the sequence of integers.

From the above equation, we see that the beamforming vector depends on the single parameter, the angle $\Phi$, and only single real value needs to be fed back. That is, instead of feeding back the entire vector $\{V_1, V_2, \ldots, V_N\}$ on N subcarriers as in the prior art, we only feed back a parametric model of the singular vector as a steering vector. In this way, all we feedback is the angle $\Phi$.

Figure 2B:
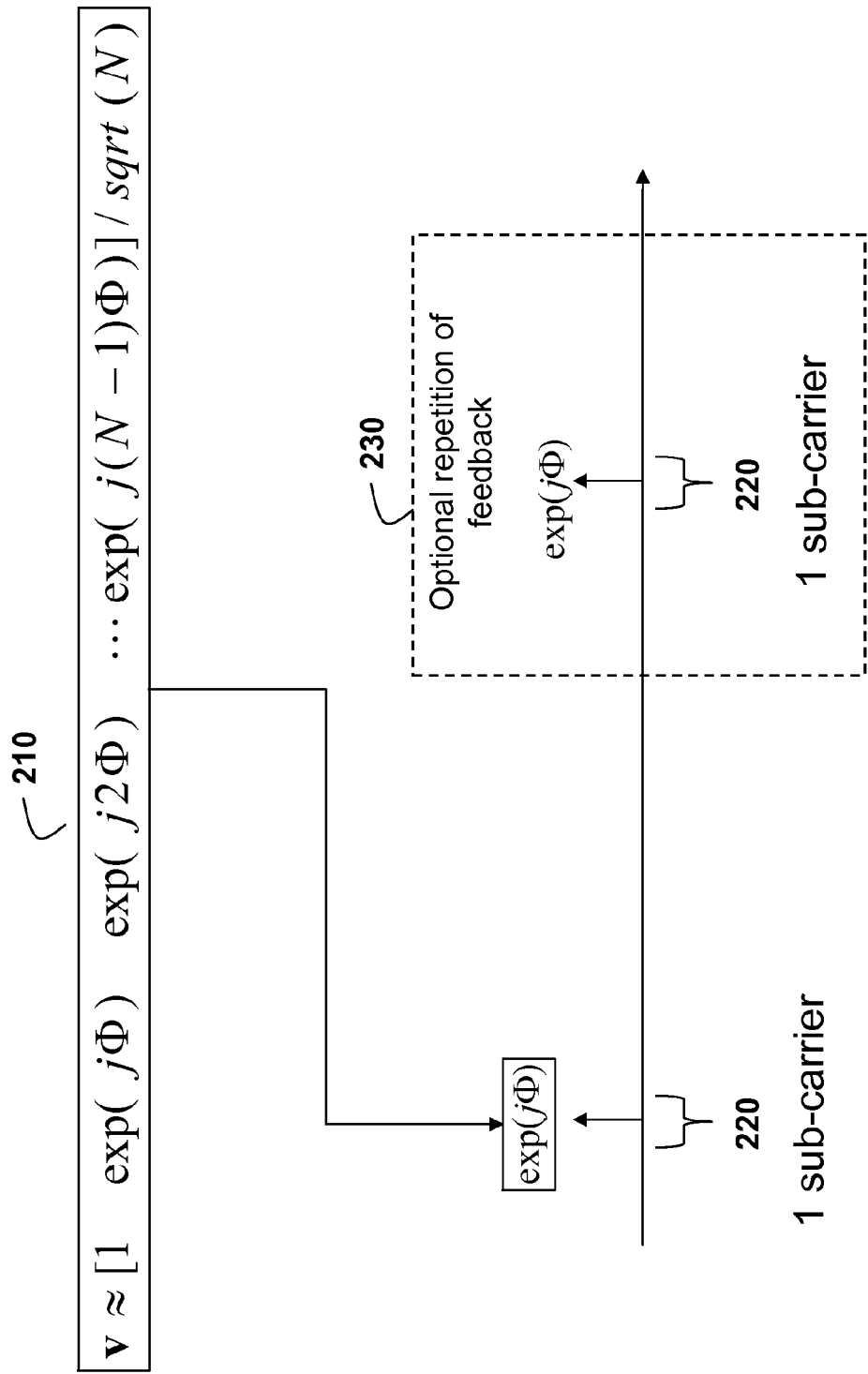
FIG. 2B is a schematic of analog feedback according to embodiments of the invention.

FIG. 2B shows generalized feedback vector 210

$$V_{MAX} = [1 \exp(j\Phi)\exp(j2\Phi) \ldots \exp(j\Phi)]/\sqrt{N}$$

for one of the N subcarriers 220 where j is an index for N, and an optional repeated feedback 230.

Compressed Feedback for Cross Polarized Antenna Arrays

Alternatively, we can use cross polarized antennas. In this case, the spacing between antennas is still $\lambda/2$, and we have either two or four cross polarized antennas (XX or XXXX).

Another array geometry of four cross polarized antennas is two widely spaced apart antennas.

For this case, the largest singular vector is approximated as two beamforming vectors, one for each polarization, with gain and phase offset between the two vectors applied to the first beamforming vector. In this case, the beamforming vector can be expressed as $V_{max} = [r \exp(j\theta)\exp(j*(0:N/2-1)*(\Phi_1)\exp(j*(0:N/2-1)*\Phi_2)]/\sqrt{N(1+r^2)/2}$.

In the case of polarized antennas, we make a note of the dimensionality of the singular vectors for each antenna geometry. Because each antenna transmits in two polarization, we actually have two logical elements for each cross polarized antenna. Thus, for an array with two cross polarized antennas, we have four antennas that can be used by the transmitter. In the above equation, the parameter N is used to index the antennas. However, each of the polarization can only have a vector of size N/2 because each polarization sees N/2 antenna ports. Thus in the above equation, the vector $V_{max}$ has dimension N and each of the two beamforming vectors for each polarization has dimension N/2.

The feedback includes one complex value, $r \exp(j\theta)$, which is the gain and phase offset between the two vectors, and which is mapped to one subcarrier (r=1 on average), and two real values, $\Phi_1$ and $\Phi_2$, which are mapped to two subcarriers.

Figure 3:
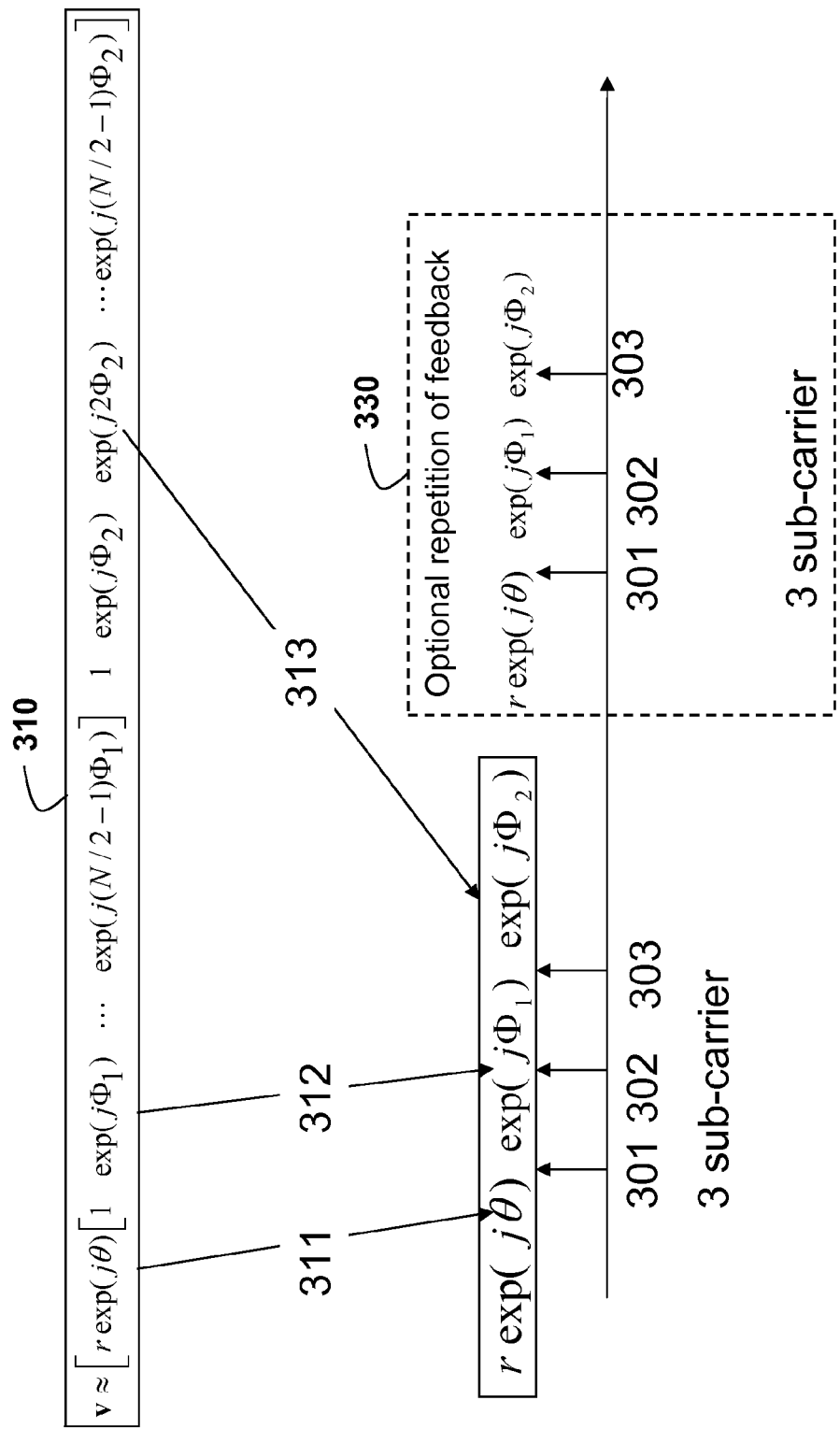
FIG. 3 is a schematic of feedback for a cross polarized array according to embodiments of the invention.

FIG. 3 shows the feedback of the vector $V_{max}$ 310 for the cross polarized array. The parameters $r\exp(j\theta)$ 311, $\Phi_1$ 312, and $\Phi_2$ 313 are mapped to three subcarriers 301, 302, 303. An optional repeated feedback 330 is also possible.

Alternatively, we can use two cross polarized antennas (XX), spaced apart by $\lambda/2$. In this case, further compression of the above feedback structure is possible with only a small decrease in performance. Given that there are only two closely spaced antennas, inaccuracies in the parameters $\Phi_2$ or $\Phi_1$ reduce performance degradation. Hence, we can amplitude modulate the subcarrier carrying $\exp(j\Phi_1)$ by a real parameter c. This parameter c is proportional to a deviation of $\Phi_2$ from $\Phi_1$ and equals 1 when $\Phi_2=\Phi_1$. On average, this deviation is zero as the long term angle of departure (AoD) for either polarization is the same. The feedbacks $r\exp(j\theta)$ 311 and $c\exp(j\Phi_1)$ 312 are mapped onto two subcarriers 310-302. and the largest singular vector is approximated as $$V_{max} \cong [r\exp(j\theta)\exp(j*(0:1)*\Phi_1)\exp(j*(0:1)*(\Phi_1+(c-1)))]/\sqrt{2+2r^2}.$$

In yet another configuration, we consider two widely spaced clusters of antenna Configuration 3 (XX XX), described below.

This antenna configuration is practical because this configuration replaces the typical two-antenna diversity configuration in many cell sites. The feedback is now done on five subcarriers.

Four real phases corresponding to the four $\lambda/2$ spaced groups of antennas, which are mapped onto two subcarriers as in Configuration 3: $c_1 \exp(j\Phi_1)$ and $c_2 \exp(j\Phi_2)$.

Three complex numbers $\alpha_1\, \alpha_2\, \alpha_3$ corresponding to the gain and phase offset of three groups relative to the first beamforming vector.

The largest singular vector is approximated as $$V_{max} \cong [1\ \exp(j\Phi_1)\ \alpha_1\ \alpha_1\exp(j(\Phi_1+c_1-1))\ \alpha_2\ \alpha_2\exp(j(\Phi_2))\ \alpha_3\ \alpha_3\exp(j(\Phi_2+c_2-1))]/\sqrt{2+2\sum_{i=1}^{3}|\alpha_i|^2}$$

Four antenna configurations classes are defined with mappings to one, three or five subcarriers for eight antennas, and one or two sub carriers for four antennas. In all cases, the feedback overhead fits into half of a Feedback Mini-Tile (FMT) as defined in the current system description document (SDD) of the IEEE 802.16m standard, and repetition coding with mapping onto different FMTs belonging to the same Secondary Fast Feedback Control Channel (SFBCH) can be applied for improved performance at low SNR.

The MS can detect the amount of antenna correlation using the long term transmit covariance matrix used for the adaptive MIMO mode, and the MAS can signal whether a compressed mode feedback is used.

The BS broadcasts the antenna configuration to facilitate this operation, wherein correlated antennas are allocated consecutive numbers. In this case, if the BS uses four $\lambda/2$ spaced cross polarized antennas, then antennas 1-4 are used for a first polarization, and antennas 5-8 for a second. Without loss of generality, this order of antennas is used to index the antenna when cross polarized configurations are considered.

Figure 4:
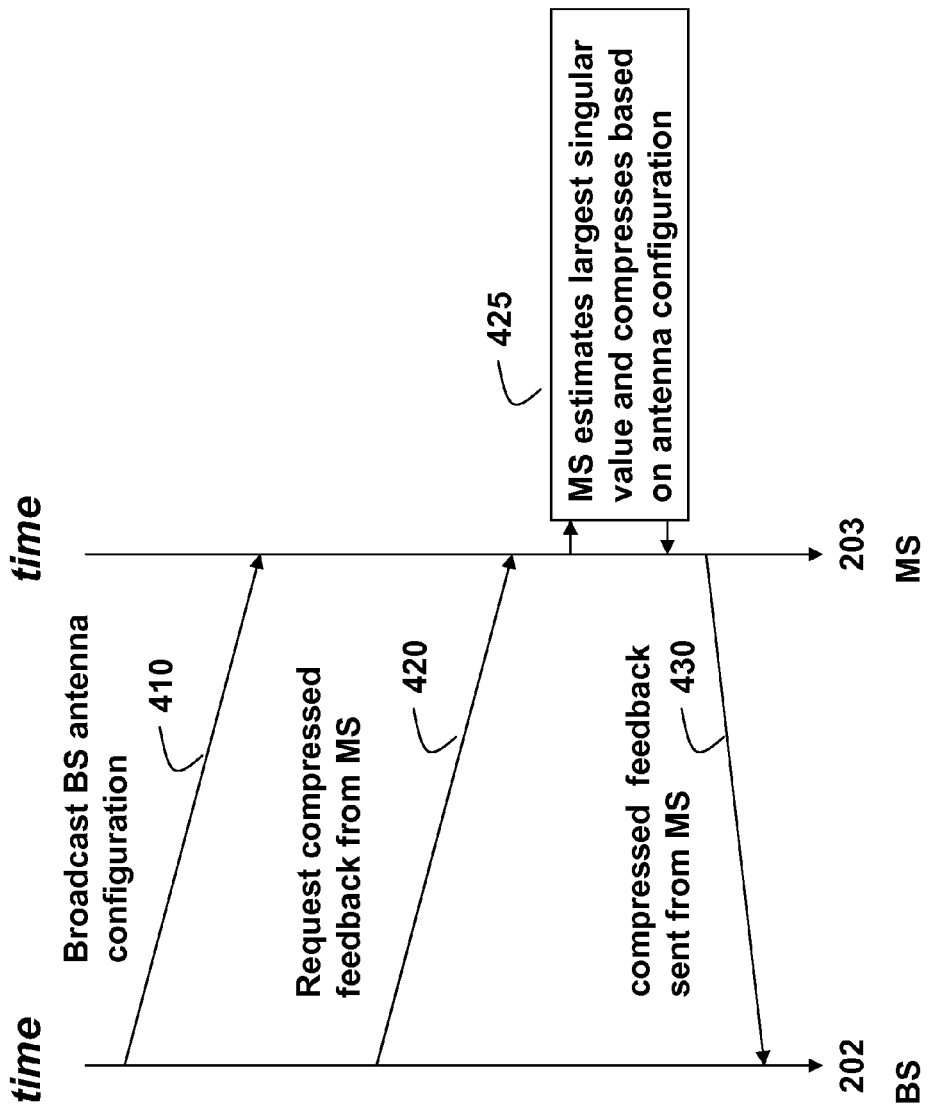
FIG. 4 is a timing diagram a feedback method according to embodiments of the invention.

The overall method is shown in FIG. 4 with time running down. The BS antenna configuration is broadcast 410 to the MS, and the MS. The broadcast message can include information on the antenna configurations of neighboring BS. Based on this message, the BS request 420 the MS to use uses an appropriate parametric feedback compression technique 425 based on the BS antenna configuration, and the MS can feedback 430 a best feedback compression for a particular antenna configuration.

While the implementation of the method is network specific, following is a description of the various feedback techniques can be used for various antenna configuration.

Antenna Configuration 1—One Beamforming Vector

This case corresponds to the ULA with N closely spaced transmit antennas at the BS. We describe three methods to estimate an angle for the beamforming vector Assuming the optimal singular vector of column V is determined as described above, we can estimate $$\exp(j\Phi) = \frac{x}{|x|},$$

where $x=V(2:N)^H*V(1:N-1)$.

Using the transmit covariance matrix R, the objective is to determine the beamforming vector $V_{max}$ that maximizes $V^H R V$. If we denote the N components of the vector $V_{max}$ by $$e^{j\Phi_i},\ i=1, 2, \ldots N,$$

then, we obtain $$V^H R V = \sum_m \sum_n R_{mn} e^{j\Phi(m-n)} = 2\mathrm{Re}\left\{\sum_{k=0}^{N-1} S_k e^{j\Phi k}\right\},$$

where the function $\mathrm{Re}\{x\}$ is the real part of x, and $$S_k = \sum_n R_{n+k,n}\ \text{for}\ k > 0\ \text{and}\ S_0 = 0.5\sum_n R_{nn},$$

where $R_{mn}$ is an entry at the $m^{th}$ row and $n^{th}$ column of the matrix R.

The value $\Phi$ that maximizes the above expression can be found to any degree of accuracy by taking a fast Fourier transform (FFT) of the N values $S_k$.

Alternatively, we can assume that the MS and BS share a set of predefined beamforming vectors $\{V_s\}$. Using the transmit covariance matrix R, the MS can perform an exhaustive search of the beamforming vector that maximizes $V_s^H R V_s$.

Then the feedback includes the index of the maximizing $V_s$. A search space of 64 options provides very good performance for eight antennas. Thus, with this method, six bits ($6=\log_2(64)$) can be fed back to the BS. Using the transmit covariance matrix R, an exhaustive search of the beamforming vector that maximizes $V^H R V$ can be performed.

Antenna Configuration 2—Two Beamforming Vectors

This case corresponds to arrays with two or four cross polarized transmit antennas, where each antenna is spaced at least half a wavelength apart at the BS. We provide three methods to estimate the angles for the two required beamforming vectors.

Assuming the optimal singular vector column V is determined as described above, we estimate $$\exp(j\Phi_1) = \frac{x}{|x|}.$$

where $$x = V(2:N/2)^H * V(1:N/2-1),$$

and $$\exp(j\Phi_2) = \frac{x}{|x|},$$

where $$x = V(N/2+2:N)^H * V(N/2+1:N-1).$$

These estimates are used to estimate the gain and phase offset as $$r\exp(j\theta) = \frac{V(1:N/2)e^{j\Phi_1[0:3]'}}{V(N/2+1:N)e^{j\Phi_2[0:3]'}},$$

and

Using the transmit covariance matrix R, we first estimate the gain as $$r = \mathrm{sqrt}\left(\frac{\sum_{i=1}^{N/2} R_{ii}}{\sum_{i=1}^{N} R_{ii}}\right),$$

and then assuming the two beamforming vectors are known, the phase offset is estimated using the top right quadrant of the matrix R, which represents the cross talk between the polarizations. In this case, the matrix R has the following form $$R = \begin{bmatrix} Q_1 & Q_3 \\ Q_3^H & Q_2 \end{bmatrix},$$

where $Q_i$, i=1, 2, 3 are the quadrants of the matrix R.

An expression $$\exp(j\theta) = \frac{x}{|x|},$$

where θ is the phase offset between the beamforming vectors, can be determined as $$x = e^{-j\Phi_1[0:N/2-1]} Q_3 e^{j\Phi_2[0:N/2-1]'}.$$

The two beamforming vectors can be determined separately by maximizing each vector with its respective quadrant $$e^{-j\Phi_i[0:3]'} Q_i e^{j\Phi_i[0:3]'}$$

as was done in the case of one beamforming vector, or jointly by exhaustive maximization of $V^H R V$ where $$V = [r\exp(j\theta)\underline{\exp(j^*(0:N/2-1)^*\Phi_1)}\exp(j^*(0:N/2-1)$$
$$^*\Phi_2)]/\sqrt{N(1+r^2)/2}.$$

Antenna Configuration 3—Compressed Two Beamforming Vectors for XX

This procedure is similarly to antenna Configuration 2 with the estimation $$c = \sqrt{1 + \sin(\Phi_2 - \Phi_1)}.$$

The square root operation is intended to compress the amplitude closer to 1.

Antenna Configuration 4—Four Beamforming Vectors:

Assuming the optimal singular vector column V is determined as described above, the four beamforming vectors per group and the three complex ratios can be determined according to the steps of antenna Configuration 3.

Alternative Mapping Approach

While the mapping of the parameters is done in an analog manner by using simple AM and phase modulation (PM), other mappings are possible. For example, the parameters can be digitized, and the first n (n=2 or more) most significant bits of the parameters can be transmitted digitally on a control channel.

Adaptive Mode

Similarly to the codebook approach, wherein a long term transmit correlation matrix is used in the adaptive mode to transform the codebook and improve performance, we can improve the performance of the compressed analog feedback mode.

The long term transmit correlation matrix used in the adaptive MIMO mode is denoted as $R_{LT}$, which is averaged over multiple sub-carriers. By denoting R as the for the narrow band transmit correlation matrix, which is estimated over one or a small number of PRB, the general objective becomes of determining the vector V that maximizes $$\frac{V^H R_{LT}^H R R_{LT} V}{\|R_{LT} V\|^2},$$

where V is of one of the parameterized structures as described above.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for feeding back channel state information (CSI) in a closed-loop (CL) multiple-input, multiple-output (MIMO) wireless networks, wherein the network includes a plurality of cells, and each cell includes a base station (BS) and a set of mobile stations (MS), wherein each BS includes a set of N antennas spaced apart by at least half a carrier wavelength λ, and wherein the N antennas are associated with N subcarriers, comprising at each MS:

determining a matrix R, wherein the matrix R is a transmit covariance matrix;

applying a singular value decomposition (SVD) to the matrix R according to $$R = U\Sigma V^H,$$

where U, V are left and right singular vector matrices, Σ is a diagonal matrix with singular values, the matrix V includes column vectors V, and $^H$ is a Hermitian operator;

approximating a beamforming vector $v_{max}$ by the column vector V having a maximum magnitude, and wherein $$v_{max}=[1\exp(j\Phi)\exp(j2\Phi) \ldots \exp(jN\Phi)]/\sqrt{N},$$

where an angel Φ is a real number, and j indexes N; and feeding back, in analog form, from the MS to the BS, only the angle Φ using a phase modulation mapping of components exp(jΦ) of the vector $v_{max}$ onto the associated subcarrier.

2. The method of claim 1, further comprising:
repeating the feeding back.

3. The method of claim 1, wherein the BS includes multiple cross polarized antennas and wherein $$v_{max}=[r\exp(j\theta)\exp(j*(0:N/2-1)*\Phi_1)\exp(j*(0:N/2-1)*\Phi_2)]/\sqrt{N(1+r^2)/2},$$

wherein the complex value r exp(jθ) is a gain and a phase offset between two beamforming vectors mapped to one subcarrier, and wherein $\Phi_1$ and $\Phi_2$ are mapped to two other subcarriers.

4. The method of claim 3, wherein the BS includes two cross polarized antennas spaced by λ/2, and further comprising:

amplitude modulating the subcarrier carrying exp(jΦ$_1$) by a real parameter c wherein the parameter c is proportional to a deviation of $\Phi_2$ from $\Phi_1$ and equals 1 when $\Phi_2=\Phi_1$.

5. The method of claim 4, wherein $$v_{max}\cong[r\exp(j\theta)\exp(j*(0:1)*(\Phi_1)\exp(j*(0:1)*(\Phi_1+(c-1))]/\sqrt{2+2r^2},$$

wherein the notation (0:1) represents a sequence of integers [i, i+1, i+2, ..., j].

6. The method of claim 1, wherein the BS includes widely spaced clusters of antennas, and the feeding back maps $c_1$ exp(jΦ$_1$) and $c_2$ exp(jΦ$_2$) to two subcarriers, and three complex numbers $\alpha_1\ \alpha_2\ \alpha_3$ correspond to the gain and the phase offset, and $$V_{max} \cong [1\ \exp(j\Phi_1)\ \alpha_1\ \alpha_1\exp(j(\Phi_1+c_1-1))\ \alpha_2\ \alpha_2\exp(j(\Phi_2))\ \alpha_3\ \alpha_3\exp(j(\Phi_2+c_2-1))]\Big/\sqrt{2+2\sum_{i=1}^{3}|\alpha_i|^2}.$$

7. The method of claim 1, further comprising:
signaling to the BS whether the MS is using a compressed mode feedback.

8. The method of claim 1, further comprising:
broadcasting, by the BS, an antenna configuration used by the BS.

9. The method of claim 8, further comprising:
broadcasting by the BS antenna configurations of neighboring BS.

10. The method of claim 9, wherein the feeding back is for a particular antenna configuration.

11. The method of claim 1, wherein $$\exp(j\Phi) = \frac{x}{|x|},$$

where $$x=V(2:N)^H*V(1:N-1),$$

and the notation (i:j) represents a sequence of integers [i, i+1, i+2, ..., j].

12. The method of claim 1, wherein the column vector in the matrix v having the maximum magnitude maximizes $V^HRV$, and the components of the vector $V_{max}$ for the N antennas are $$e^{j\Phi_i},\ i=1,2,\ldots,N,$$

and $$V^HRV = \sum_m \sum_n R_{mn}e^{j\Phi(m-n)} = 2\text{Re}\left\{\sum_{k=0}^{N-1} S_k e^{j\Phi k}\right\},$$

where the notation (i:j) represents a sequence of integers [i, i+1, i+2, ..., j], the function Re{x} is the real part of x, and $$S_k = \sum_n R_{n+kn}\ \text{for}\ k>0\ \text{and}\ S_0 = 0.5\sum_n R_{nn},$$

where $R_{mn}$ is an entry at the $m^{th}$ row and $n^{th}$ column of the matrix R.

13. The method of claim 12, wherein Φ is maximized by taking a fast Fourier transform (FFT) of the N values of $S_k$.

14. The method of claim 2, wherein $$\exp(j\Phi_1) = \frac{x}{|x|},$$

where $$x=V(2:N/2)^H*V(1:N/2-1),$$

where the notation (i:j) represents a sequence of integers [i, i+1, i+2, ..., j], and $$\exp(j\Phi_2) = \frac{x}{|x|},$$

where $$x=V(N/2+2:N)^H*V(N/2+1:N-1),\ \text{and}$$

the gain is $$r\exp(j\theta) = \frac{V(1:N/2)e^{j\Phi_1[0:3]'}}{V(N/2+1:N)e^{j\Phi_2[0:3]'}},$$

and $$r = sqrt\left(\frac{\sum_{i=1}^{N/2} R_{ii}}{\sum_{i=1}^{N} R_{ii}}\right),$$

and the phase offset is estimated using a top right quadrant of the matrix R $$R = \begin{bmatrix} Q_1 & Q_3 \\ Q_3^H & Q_2 \end{bmatrix},$$

which represents the cross talk between the polarizations, where $Q_i$, i=1, 2, 3 are quadrants of the matrix R, and $$\exp(j\theta) = \frac{x}{|x|},$$

where $\theta$ is the phase offset between the beamforming vectors is $$x = e^{-j\Phi_1[0:N/2-1]} Q_3 e^{j\Phi_2[0:N/2-1]'}.$$

15. The method of claim 4, wherein $$c = \sqrt{1+\sin(\Phi_2 - \Phi_1)}.$$

16. The method of claim 1, wherein the matrix R is a long term transmit correlation matrix $R_{LT}$, which is averaged over multiple sub-carriers, and wherein the column vector V having the maximum magnitude maximizes $$\frac{V^H R_{LT}^H R R_{LT} V}{\|R_{LT} V\|^2}.$$

* * * * *